Jan. 2, 1968 J. TYPKE 3,361,955
CURRENT LIMITING FOR POWER SUPPLY SWITCHING TRANSISTORS
Filed Sept. 7, 1965
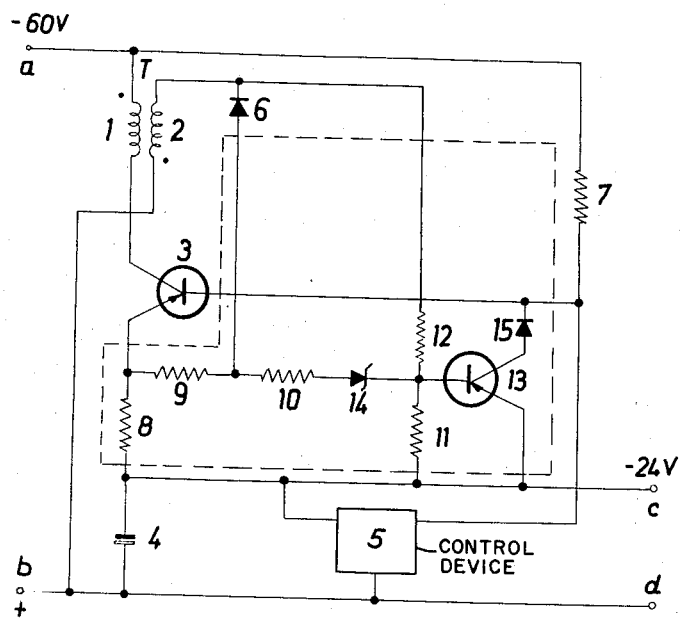
FIG. 1.
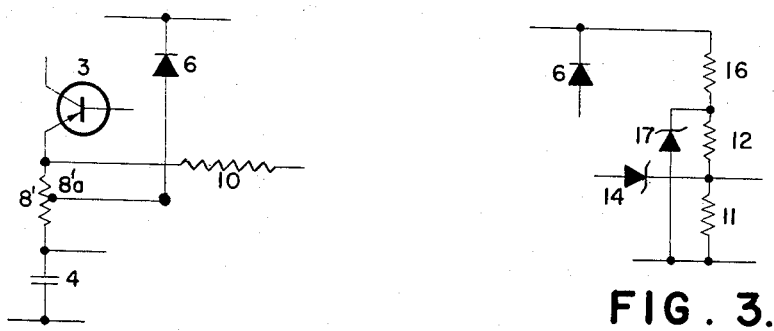
FIG. 2.
FIG. 3.
INVENTOR
Jürgen Typke
BY *Spencer & Kaye*
ATTORNEYS

# United States Patent Office 3,361,955
Patented Jan. 2, 1968

3,361,955
CURRENT LIMITING FOR POWER SUPPLY SWITCHING TRANSISTORS
Jürgen Typke, Backnang-Unterschontal, Germany, assignor to Telefunken Patentverwertungs-G.m.b.H., Ulm (Danube), Germany
Filed Sept. 7, 1965, Ser. No. 485,355
Claims priority, application Germany, Sept. 11, 1964, T 26,987
9 Claims. (Cl. 323—22)

The present invention relates to a regulated power supply wherein the primary winding of a transformer, the switching path of a switching transistor and a capacitor are connected in series between the input terminals of the power supply, the base of the switching transistor being connected through a resistor to the input terminal at the transformer side, and also to a control device which operates periodically depending on the output voltage at the capacitor, and wherein the secondary winding of the transformer is connected in series with a rectifier between the capacitor terminals.

Generally, in regulated power supplies such as the supply shown in FIGURE 3 of DAS (German published patent application) No. 1,135,080, there is often a need for additional current limiters so as to prevent the input current from rising above a predetermined limiting value.

A known regulated power supply which in a simple manner produces from a fluctuating direct voltage a lower constant direct voltage is shown in German Patent No. 1,123,749. This known power supply comprises an additional circuit which protects the switching transistor from high currents which occur during switching and from the appearance of a short circuit at the output side. As a result of the additional circuit, the base current of the switching transistor can not exceed a specific limiting value. The circuit, however, has the disadvantage that the limiting value of the output current is dependent not only on the current amplification factor of the switching transistor but also on the difference between the input and output voltage of the power supply. The dependence on the amplification factor leads to difficulties when the switching transistor is exposed to large fluctuations in temperature and when there is the requirement that all the active components of the circuit be interchangeable with mass produced specimens of the same type, and the dependence on the voltage difference can only be eliminated with a considerable loss in efficiency.

It is therefore an object of the present invention to provide an improved regulated power supply.

It is another object to provide a regulated power supply having a current limiting portion which is not affected by the current amplification factor of the switching transistor or the voltage difference within the power supply.

The present invention provides a regulated power supply which embraces all the advantages of known power supplies and none of the aforedescribed disadvantages. To attain this, the present invention provides a first resistor connected between the emitter of the swiching transistor and the capacitor, the rectifier being connected through a resistor to the terminal of the first resistor at its emitter side and through a resistor to the base of an additional switching transistor which is in turn connected through a resistor to the connection of the secondary winding at the rectifier side, and through a resistor both to the capacitor terminal adjacent to the switching transistor and to the emitter of the additional switching transistor, the collector of which is connected, preferably through a diode, to the base of the switching transistor, and that the relationship:

$$\frac{N_1}{N_2} > \frac{R_1}{R_1+R_2}$$

is satisfied, in which $N_1$ represents the number of turns in the primary winding, $N_2$ the number of turns in the secondary winding of the transformer, $R_1$ is the resistance of the resistor interposed between the emitter of the switching transistor and the capacitor, and $R_2$ the resistance of the resistor connected between the emitter of the the switching transistor and the rectifier.

Additional objects and advantages of the present invention will become apparent upon consideration of the following description when taken in conjunction with the accompanying drawings in which:

FIGURE 1 is a circuit diagram of an embodiment of a regulated power supply according to the present invention in which the current limiting portion is shown within the dashed lines.

FIGURE 2 is a partial circuit diagram of another embodiment of the current limiting circuit of FIGURE 1 when $N_2 < N_1$.

FIGURE 3 is a partial circuit diagram of another modification of the current limiting circuit of FIGURE 1 or FIGURE 2.

Referring now to the drawing, there is shown in FIGURE 1 a regulated power supply having input terminals $a$ and $b$ and output terminals $c$ and $d$. The power supply comprises a transformer T, having a primary winding 1 and a secondary winding 2. The winding 1 has one terminal connected to terminal $a$ and the other terminal connected to one terminal of a capacitor 4 through the emitter-collector switching path of a switching transistor 3, the other terminal of the capacitor being connected to terminal $b$. The base of the switching transistor 3 is connected through a resistor 7 to the input terminal $a$ at the connection of winding 1 and to an electronic control device 5 which operates periodically depending upon the output voltage at the capacitor 4, and which is connected between the terminals thereof. The control device 5 may, for example, comprise a transistorized Schmitt-trigger and switching stages controlled thereby. The secondary winding 2 of the transformer is connected in series with a rectifier 6 between the terminals of capacitor 4.

The portion of the regulated power supply circuit functioning as an additional current limiter is shown within the dashed lines and comprises a resistor 8 connected between the emitter of the switching transistor 3 and the capacitor 4. The circuit further comprises the rectifier 6 being connected through a resistor 9 to the emitter of transistor 3 and through a resistor 10 and a Zener diode 14 to the base of an additional switching transistor 13. The base of transistor 13 is further connected through a resistor 12 to the secondary winding 2 at the connection of the rectifier 6 and through a resistor 11 both to the terminal of capacitor 4 connected to resistor 8 and to the emitter of the transistor 13. The collector of transistor 13 is preferably connected through a diode 15 to the base of transistor 3, with the relationship of:

$$\frac{N_1}{N_2} > \frac{R_8}{R_8+R_9}$$

being maintained within the power supply circuit, with $R_8$ and $R_9$ representing the resistance of resistors 8 and 9, respectively.

The operation of the circuit is essentially as follows: In accordance with the conventional operation of a two-position regulated power supply, the electronic control device 5 causes, depending on the voltage at the capacitor 4, periodic control current pulses to flow through the resistor 7 and the input direct current voltage source connected between the terminals $a$ and $b$. As a result of the produced sudden changes in the base potential of the switching transistor 3, this transistor is accordingly controlled so as to periodically alternate between a cut off and a conducting condition.

When the switching transistor 3 is conducting, the current flowing through the primary winding 1, the switching transistor 3, the resistor 8 and the capacitor 4 rises substantially linearly and produces at the resistor 8 a voltage drop which correspondingly increases. At the same time, a voltage is induced in the secondary winding 2 of such polarity that the portion of the voltage appearing at resistor 11 cuts off the additional switching transistor 13, the resistor 11 forming together with resistor 12 a base voltage divider for the transistor 13. The voltage drop at the resistor 11, however, is influenced to an increasing extent by the increasing voltage drop at the resistor 8; however, the inclusion of the stabilizing Zener diode 14 enables this influence to become effective only after a predetermined voltage has been exceeded. When this voltage value is reached, the voltage at the resistor 11 reverses its polarity and the additional transistor 13 begins to conduct. The collector current of the additional transistor 13 then flows through the resistor 7 in addition to the base current of the switching transistor 3. Since the collector current continues to increases, the base current of the switching transistor 3 must decrease and therefore, the operation of the transistor is changed from a conductive condition to a cut off condition. When the transistor is in the active region, the rate of increase in the current in the primary winding 1 is reduced. A reduced rate of current change in the primary current, however, necessarily results in a lower voltage being induced in the secondary winding 2. Consequently, the secondary current which flows via the path comprising winding 2, resistors 12, 14, 10 and 9, transistor 3, primary winding 1, and the input voltage source is reduced. It is therefore important for the operation of the current-limiting portion of the circuit that the voltage drop produced by the secondary current at the resistor 10 should likewise decrease, thereby allowing the base current of the additional switching transistor 13 to rise to a greater extent than would actually result from the now reduced voltage increase at the resistor 8. Thus a closed feedback circuit is formed which causes an immediate cutting off of the switching transistor 3 as soon as the transistor is no longer in the saturation region. Thus the current limiting becomes effective at the moment the switching transistor 3 is driven from the saturation region into the active region. The current flowing in the secondary winding 2 during the time when the switching transistor 3 is cut off, produces voltage drops in the same direction at the resistors 8 and 9. Their voltage sum must be at least as great as the voltage drop previously existing at the resistor 8, in order to maintain the additional switching transistor 13 in the conductive condition. At the same time, the voltage drop at the resistor 8 serves as a cut-off voltage for the switching transistor 3 since its positive terminal is connected through the switching path of transistor 13 to the base of said transistor 3. As soon as the secondary current has decayed, as a result of the decrease in the energy stored in the magnetic field, to such an extent that the additional switching transistor 13 is no longer conductive, the switching transistor 3 begins to conduct again. A rise in the primary current, however, results in an immediate drop in the secondary current. Therefore, in order that the rise in the primary current may be self-supporting, a closed feedback circuit may be provided. The rise in the primary current must lead to a drop in the total voltage present at the resistors 8 and 9, and therefore the relationship:

$$\frac{N_1}{N_2} > \frac{R_8}{R_8 + R_9}$$

applies.

If $N_2 < N_1$, the circuit embodiment shown in FIGURE 2 is used. In this figure, the resistor 10 is connected to the terminal of a resistor 8' at its emitter side and the rectifier 6 is connected to a tap 8'$a$ of the resistor 8'. Thus, a resistance path ($a$) is formed by the resistor 8' between the emitter of transistor 3 and the capacitor 4 and a resistance path ($b$) is formed between the tap 8'$a$ connected to the rectifier 6 and the emitter of transistor 3. The value of resistance path ($a$) then represents $R_8$ in the above relationship, and the resistance path ($b$) then amounts to a value which represents $-R_9$ in the above relationship.

The diode 15 serves to prevent a flow of current when the base potential of the switching transistor 3 is more positive than that of the additional switching transistor 13 during the switching over by the control device 5.

As shown in FIGURE 3, which is a modification which may be used with the circuits of FIGURE 1 or FIGURE 2, a resistor 16 may be additionally connected into the connecting conductor between the resistor 12 and the secondary winding 2, and a further Zener diode 17 may be connected in parallel with the series connection of the resistors 11, 12. Thus, the limiting value of the primary current is not dependent on the portion of the input voltage drop which occurs at the primary winding.

It will be understood that the above description of the present invention is susceptible to various modifications, changes and adaptations, and the same are intended to be comprehended within the meaning and range of equivalents of the appended claims.

What is claimed is:

1. In a regulated power supply, wherein the primary winding of a transformer, the collector-emitter switching path of a first switching transistor, and a capacitor are connected in series across the input terminals of said regulated power supply, the primary winding being connected to one of the input terminals, the output appearing across the capacitor, the base of the first switching transistor being connected through a first resistor to the one input terminal and also to a control device connected across the capacitor, which operates periodically depending on the output voltage at the capacitor, and wherein a rectifier having first and second electrodes has the first electrode connected to one terminal of the secondary winding of the transformer, the other terminal of the secondary winding being connected to the other input terminal, the improvement comprising a current limiting circuit including:
  (1) means forming
     (a) a resistance path incorporated in the series circuit and interposed between the capacitor and the emitter of the first transistor, and
     (b) a resistance path connected between the emitter of the first transistor and the second electrode of the rectifier;
  (2) a second transistor;
  (3) a second resistor having one terminal connected to the base of said second transistor and the other terminal connected to the second electrode of the rectifier;
  (4) a third resistor having one terminal connected to the base of said second transistor and the other terminal to the first electrode of the rectifier;
  (5) a fourth resistor having one terminal connected to the base of said second transistor and the other terminal connected to the junction between the capacitor and said resistance path (a) and also to the emitter of said second transistor; and (6) a diode having one electrode connected to the collector of said second transistor and the other electrode connected to the base of the first transistor and also to one terminal of the first resistor;

(7) the relationship between the number of turns $N_1$ in the primary winding, the number of turns $N_2$ in the secondary winding, the resistance $R_1$ of the resistance path (a) connected between the emitter of the first transistor and the capacitor, and the resistance $R_2$ of the resistance path (b) connected between the emitter of the first transistor and the rectifier, being $$\frac{N_1}{N_2} > \frac{R_1}{R_1 + R_2}$$

2. A current limiting circuit as defined in claim 1 wherein $N_2 > N_1$, and wherein said resistance path (a) is constituted by a fifth resistor connected between the emitter of the first transistor and the capacitor, and said resistance path (b) is constituted by a sixth resistor connected between the emitter of the first transistor and the second electrode of the rectifier.

3. A current limiting circuit as defined in claim 1 wherein $N_2 < N_1$, and wherein said resistance path (a) is constituted by a fifth resistor having one terminal connected to the emitter of the first transistor and the other terminal connected to the capacitor, said fifth resistor having a tap intermediate the terminals thereof, said tap being connected to the second electrode of the rectifier, in consequence of which said resistance path (b) is constituted by the negative value of the portion of said fifth resistor between said tap and the emitter of the first transistor.

4. A current limiting circuit as defined in claim 1 and further comprising a first Zener diode connected to the base of said second transistor and to said one terminal of said second resistor.

5. A current limiting circuit as defined in claim 4 and further comprising a fifth resistor connected between said third resistor and the first electrode of the rectifier, and a second Zener diode connected across said third and fourth resistors.

6. A regulated power supply having a pair of input terminals and a pair of output terminals, comprising, in combination:

(1) a first transistor having a base, a collector, and an emitter;

(2) a transformer having a primary and a secondary winding, said primary winding being connected between one of said input terminals and the collector of said first transistor;

(3) a capacitor having one plate connected to the other input terminal, the output terminals of said power supply being connected to the capacitor plates;

(4) a first resistor connected between the emitter of said first transistor and the other plate of said capacitor;

(5) a second resistor connected across the base of said first transistor and said one input terminal;

(6) a control device connected to the base of said first transistor and across said capacitor at the output terminals of said regulated power supply;

(7) a second transistor having a base, a collector and an emitter;

(8) a third resistor having one terminal connected to the emitter of said first transistor;

(9) a fourth resistor having one terminal connected to the other terminal of said third resistor;

(10) a first diode having an anode and a cathode, the anode being connected to the junction between said third and fourth resistors and the cathode being connected through said secondary winding to the other input terminal;

(11) a fifth resistor having one terminal connected to the base of said second transistor and the other terminal connected to the junction between said first resistor and said capacitor and also the emitter of said second transistor;

(12) a sixth resistor connected between the base of said second transistor and the cathode of said first diode;

(13) a first Zener diode having one terminal connected to the base of said second transistor and the other electrode connected to the other terminal of said fourth resistor; and

(14) a second diode having one electrode connected to the collector of said second transistor and the other electrode connected to the base of said first transistor and also to one terminal of said second resistor;

(15) the relationship between the number of turns $N_1$ in the primary winding, the number of turns $N_2$ in the secondary winding, the resistance $R_1$ of the resistor connected between the emitter of the first transistor and the capacitor; the resistance $R_2$ of the resistor connected between the emitter of the first transistor and the rectifier, being $$\frac{N_1}{N_2} > \frac{R_1}{R_1 + R_2}$$

7. A regulated power supply as defined in claim 6 and further comprising:

(1) a seventh resistor connected between said sixth resistor and the cathode of said first diode; and (2) a second Zener diode connected across said fifth and sixth resistors.

8. A regulated power supply having a pair of input terminals and a pair of output terminals comprising, in combination:

(1) a first transistor having a base, a collector, and an emitter;

(2) a transformer having a primary and a secondary winding, said primary winding being connected between one of said input terminals and the collector of said first transistor;

(3) a capacitor having one plate connected to the other input terminal, the output terminals of said power supply being connected to the capacitor plates;

(4) a first resistor connected between the emitter of said first transistor and the other plate of said capacitor;

(5) a second resistor connected across the base of said first transistor and said one input terminal;

(6) a control device connected to the base of said first transistor and across said capacitor at the output terminals of said regulated power supply;

(7) a second transistor having a base, a collector and an emitter;

(8) a third resistor having one terminal connected to the emitter of said first transistor;

(9) a first diode having an anode and a cathode, the anode being connected to a tap of said first resistor and the cathode being connected through said secondary winding to the other input terminal;

(10) a fourth resistor having one terminal connected to the base of said second transistor and the other terminal connected to a junction between said first resistor and said capacitor and also to the emitter of said second transistor;

(11) a fifth resistor connected between the base of said second transistor and the cathode of said first diode;

(12) a first Zener diode having one electrode connected to the base of said second transistor and the other electrode connected to the other terminal of said third resistor;

(13) a second diode having one electrode connected to the collector of said second transistor and the other electrode connected to the base of said first transistor and also to one terminal of said second resistor; and

(14) the relationship between the number of turns $N_1$ in the primary winding, the number of turns $N_2$ in the secondary winding, the resistance $R_1$ of the resistor connected between the emitter of the first transistor and the capacitor, and the resistance $R_2$ of the portion of the resistor connected between the emitter of the first transistor and the first diode, being $$\frac{N_1}{N_2} > \frac{R_1}{R_1 - R_2}$$

when $N_2 < N_1$.

9. A regulated power supply as defined in claim 8 and further comprising:

(1) a sixth resistor connected between said fifth resistor and the cathode of said first diode; and
(2) a second Zener diode connected across said fourth and fifth resistors.

References Cited
UNITED STATES PATENTS 3,088,067 4/1963 Sender _____ 323—22
3,109,941 11/1963 Winchel _____ 323—18 X

FOREIGN PATENTS 1,299,729 6/1962 France.

JOHN F. COUCH, *Primary Examiner.*